UNITED STATES PATENT OFFICE.

JOSEPH KEISER, OF YORK, PENNSYLVANIA.

IMPROVEMENT IN MEDICAL COMPOUNDS FOR CURE OF RHEUMATISM, &c.

Specification forming part of Letters Patent No. 120,074, dated October 17, 1871.

*To all whom it may concern:*

Be it known that I, JOSEPH KEISER, of York, in the county of York and State of Pennsylvania, have invented certain new and useful Improvements in Compound for Rheumatism and Ague; and do hereby declare that the following is a full, clear, and exact description thereof.

My compound is composed of the following ingredients: One gallon of old rye whisky or other good spirits; one gallon of water; two pounds poke-berries; one pound elder-berries; four ounces gentian; four ounces sweet spirits of nitre; and one pound of pulverized white sugar. These ingredients, except the water, are thoroughly mixed together, heated in a suitable vessel, and then distilled. After this the water is added, when the compound is ready for use.

This mixture is very beneficial in the treatment of rheumatism and fever and ague, and is to be taken inwardly. The dose is one tablespoonful three times a day.

I do not confine myself to the precise proportions of the ingredients herein mentioned, as they might perhaps be varied under certain circumstances.

Having thus fully described my invention, what I claim as new, and desire to secure by Letters Patent, is—

The within-described compound, composed of the ingredients, substantially for the purposes herein set forth.

In testimony that I claim the foregoing I have have hereunto set my hand this 14th day of September, 1871.

JOSEPH KEISER.

Witnesses:
EDM. F. BROWN,
HARRY C. SCOTT.

(28)